United States Patent Office 3,558,174
Patented Jan. 26, 1971

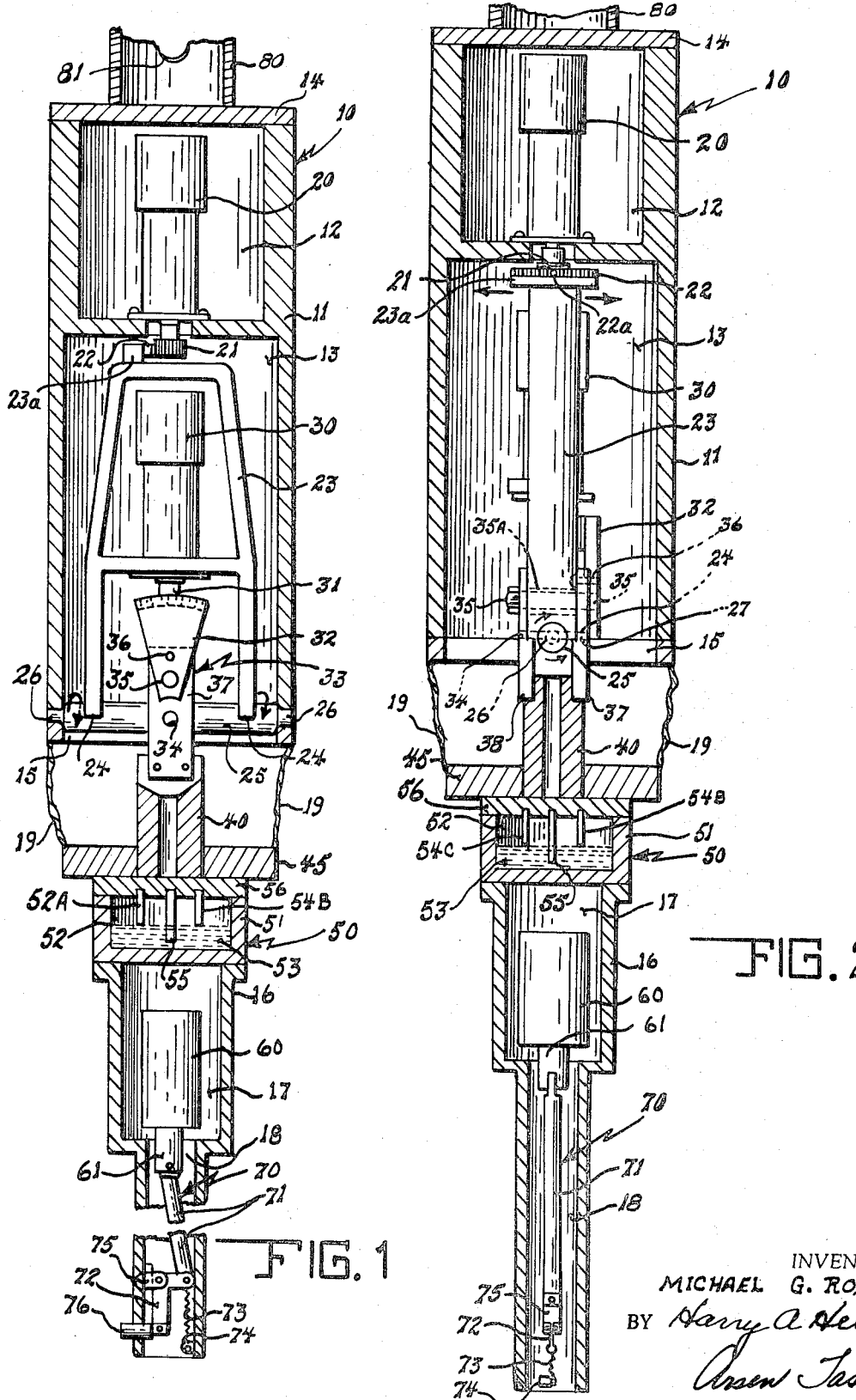

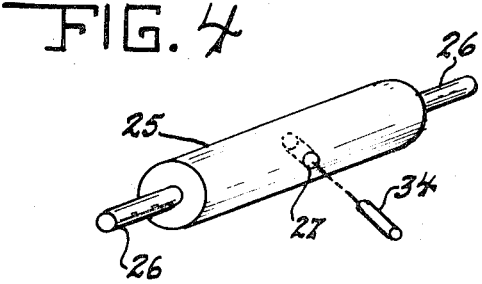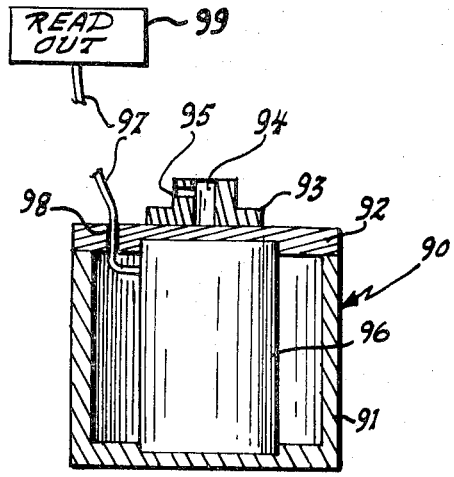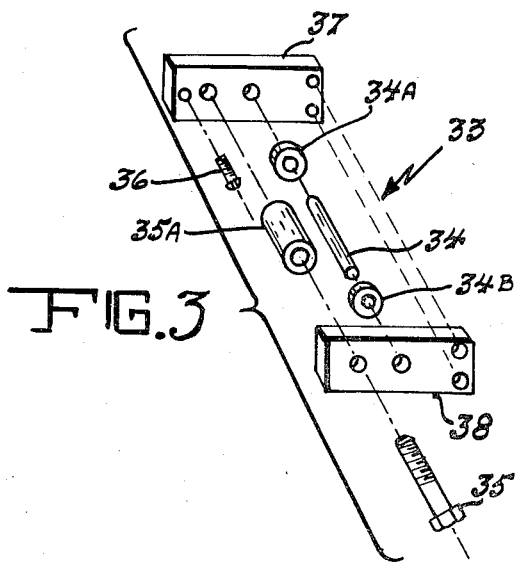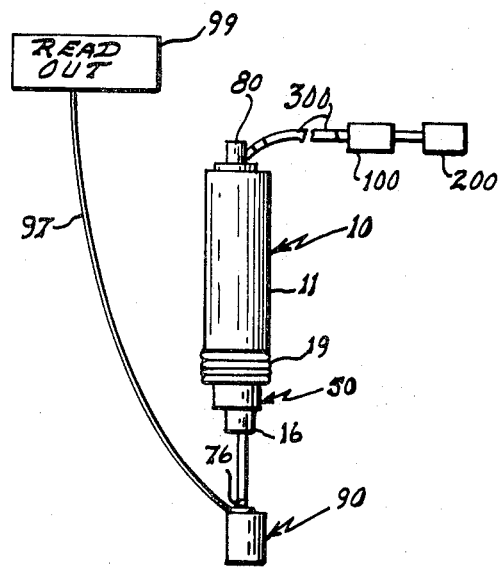

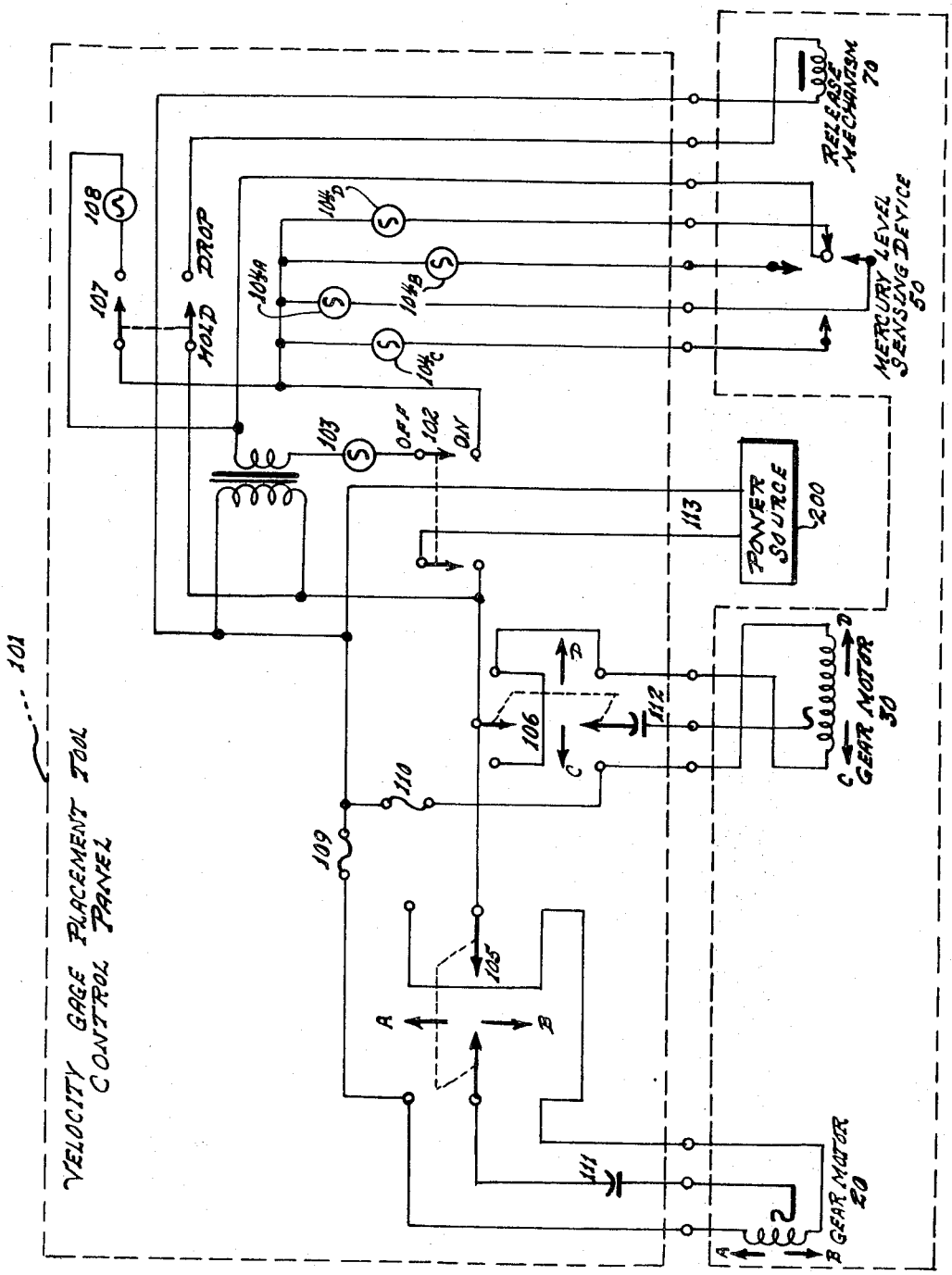

3,558,174
VELOCITY GAGE PLACEMENT TOOL ASSEMBLY
Michael G. Robinson, Riverside, Calif., assignor to the United States of America as represented by the Secretary of the Air Force
Filed July 5, 1968, Ser. No. 742,765
Int. Cl. E21b 23/00
U.S. Cl. 294—86.13                         2 Claims

ABSTRACT OF THE DISCLOSURE

A placement tool assembly to remotely place, level and release a velocity gage or other level-sensitive device in a deep and near-vertical hole in the earth. The assembly includes means for lowering the assembly and the velocity gage within the hole, a placement tool, a remote control panel with leads to the placement tool, and an external power source to the remote control panel. The placement tool includes two gearmotors to level the velocity gage, within the hole, in each of two orthogonal horizontal axes, a mercury level sensing device for indicating when the velocity gage is level, and a solenoid to hold the velocity gage during placement and leveling and to release it after placement and leveling. The remote control panel provides switches for controlling the gearmotors which level the velocity gage, visual means for determining when the velocity gage is level, and a switch for releasing the correctly positioned velocity gage.

BACKGROUND OF THE INVENTION

This invention relates to an apparatus for remotely placing, leveling and releasing in the leveled condition, a level-sensitive device deep within a hole. More particularly, this invention relates to an apparatus for remotely placing, leveling and releasing a velocity gage, in the leveled condition, within a hole in the earth.

It is to be noted and understood that the word "hole," as used herein, is intended to mean a borehole, or the like, which is vertical or has a maximum deviation, or is out-of-plum, ±7° from said vertical.

It is also to be noted and understood that the phrases "deep hole," "deep within a hole," or the like, as used herein, are intended to mean that the hole is of such a depth, or is of such a small diameter, that the device to be placed, leveled and released, in a leveled condition therein, cannot be placed and leveled manually within the hole.

It is further to be noted and understood that the phrase "level-sensitive device," or the like, as used herein, is intended to mean a device which requires leveling or which is to be used in a level condition.

It is additionally to be noted and understood that the word "level" or the phrase "level condition," or the like, as used herein, is intended to mean parallel to two orthogonal horizontal axes, i.e., comparable to pitch and roll, but not inclusive of azimuth, bearing, heading or the like.

It is also to be noted and understood that by the term "velocity gage" is meant a highly overdamped, low-natural frequency accelerometer operating in the velocity portion of its response spectrum. Its sensing element is a carrier excited, variable-reluctance pickup, which is employed in a standard bridge circuit. The purpose of the velocity gage is to measure particle velocities in a soil environment.

In the art of drilling of boreholes there are devices for determining the inclination of the drilling apparatus, for determining the deviation from the vertical, and for controlling the direction of the drilling tool and, therefore, of the drilling. In addition, there are detectors for ascertaining, after-the-fact, azimuthal and inclination orientation of a device already within the borehole. However, there is no known apparatus for leveling a device while it is within the borehole, with provision for releasing the device within the borehole after leveling. In fact, and specifically in connection with the placement, leveling and release of velocity gages in boreholes, the conventional method is simply that of haphazard trial-and-error. Not only is this method time consuming, but it is also inherently inaccurate, particularly if the borehole is out-of-plumb.

My invention constitutes an advancement in the state-of-the-art in that it allows the accurate placement, leveling and release of a device within a borehole and, in addition, permits all of this to be done remotely, rapidly, conveniently and economically.

SUMMARY OF THE INVENTION

This invention relates to the placement, leveling and release, all by remote control, of a level-sensitive device in a borehole.

Therefore, an object of this invention is to provide an apparatus with which, by remote control, a level-sensitive device within a borehole can be accurately placed, leveled and released when in a leveled condition.

Another object of this invention is to simplify the placement, leveling and release of a device within a borehole and to shorten the length of time to do so.

Still another object of this invention is to eliminate the need for an accurately plumbed borehole.

A further object of this invention is to permit the release of a leveled device within a borehole without movement of the leveled device.

These, and still other, objects of my invention will become readily apparent after a consideration of the description of my invention and reference to the drawings.

DESCRIPTION OF THE DRAWINGS

FIG. 1 is a vertical cross section, partially fragmented and schematic in form, of a preferred embodiment of the placement tool component of my invention;

FIG. 2 is, similarly, a vertical cross section, partially fragmented and schematic in form, of a preferred embodiment of the placement tool component of my invention, and represents a generally side view of FIG. 1;

FIG. 3 is an exploded view of a principal component assembly of my invention;

FIG. 4 is an isometric representation of two major component parts of my invention showing how they interact;

FIG. 5 is a vertical cross section of a component of my invention;

FIG. 6 is a schematic representation of a preferred circuit, and associated components, to operate my invention; and FIG. 7 is an external view, in schematic form, of the major components of the preferred embodiment of my invention and how they are interrelated.

DESCRIPTION OF A PREFERRED EMBODIMENT

My invention, a velocity gage placement tool assembly, includes a placement tool, a container to hold the velocity gage, a cable from the velocity gage to a read-out instrument, a remote control panel with a cable to the placement tool, a power source external of but connected to the remote control panel, and means for lowering, down the borehole, the placement tool assembly, except for those components which remain at the earth's surface, such as the remote control panel, the power source, and the velocity gage read-out instrument.

With reference to FIGS. 1 and 2, wherein the same parts are similarly numbered, placement tool 10 has a longitudinal or vertical axis and includes, as major components, gearmotor 20, gearmotor 30, pivot assembly 33, linking member 40, mercury level sensing device 50, solenoid 60, and release mechanism assembly 70 with pin or plunger 76.

Gearmotor 20, such as commercially available Globe Industries Stock No. 59A113–4230, is reversible and has a shaft with pinion 21 which, as a result, can be rotated in either direction. Gearmotor 20 is mounted in upper portion 12 of housing 11, which also has a lower portion 13. Shaft and pinion 21 of gearmotor 20 extend into lower portion 13 of housing 11. Pinion 21 meshes with rack 22 of rack frame or cage 23, which is located in lower portion 13 of housing 11. The long axis, i.e., the toothed length of rack 22 is perpendicular to the wide dimension of rack frame 23 and is pivotably joined at 22a to the top 23a of rack frame 23 in such a manner as to permit translational movement of rack 22 but tilting or erecting movement of rack frame 23. The ends 24 of rack frame 23 are rigidly affixed to cylindrical rotatable member 25 which has step-down, i.e., journaled cylindrical ends 26 and a transverse circular opening 27 throughout its diameter at its midpoint. Ring 15 is affixed at the bottom of lower portion 13 of housing 11 and has openings to accept, and permit rotation of, journaled ends 26 of member 25.

Gearmotor 30, such as commercially available Globe Industries Stock No. 59A113–16150 is mounted, as shown in FIGS. 1 and 2, on rack frame 23 in lower portion 13 of housing 11. Gearmotor 30 is reversible and has a shaft and bevel gear 31 which, as a result, can be rotated in either direction. Bevel gear 31 meshes with segmented bevel gear 32 which is rigidly affixed to pivot assembly 33.

FIG. 3 depicts, in an exploded view, the component parts of pivot assembly 33. These include, but are not limited to, screw 36, bolt 35, spacer 35A, spacers 34A and 34B, plates 37 and 38, and cylindrical member or pin 34, the diameter of which is nearly equal to the diameter of cylindrical opening 27 (FIG. 2). The length of pin 34 exceeds the thickness or width, when assembled, of pivot assembly 33, from the outer surface of plate 37 to the outer surface of plate 38.

FIG. 4 shows the interrelationship and positional cooperation of cylindrical pin 34 of pivot assembly 33 and cylindrical rotatable member 25 having at its midpoint a transverse circular opening 27 throughout its diameter.

With reference again to FIGS. 1 and 2, housing 11 has a cap 14 at the upper end and, as previously stated, a ring 15 at the lower end. Lower portion 13 of housing 11 is, therefore, open-ended at the position where ring 15 and pivot assembly 33 are located.

Again with reference to FIGS. 1 and 2, member 40 is a linkage between pivot assembly 33 and mercury level sensing device 50, with ring 45 interposed therebetween.

Mercury level sensing device 50, FIGS. 1 and 2, is a block 51 of rigid electrically nonconductive plastic, such as "Plexiglas," with a ¾ inch deep, 1½ inch diameter hole 52 drilled in its center and a pool of mercury 53, ¼ inch deep, in the hole. Four stationary rhodium-plated copper probes 54A, 54B, 54C and 54D are positioned at 90° intervals around the hole, such that the tips of the probes just make contact with the surface of the mercury when block 51 is leveled. The four probes 54A, 54B, 54C and 54D, as well as the fifth probe 55 which extends into the pool of mercury and acts as the center conductor, are attached to a lid 56 of rigid electrically nonconductive plastic, such as "Plexiglas," that fits over, and is affixed to, the top of block 51. The air atmosphere over the mercury pool is replaced with methyl alcohol.

Mercury level sensing device 50 is affixed, in a level condition, to housing 16 which has an upper chamber 17 and a lower chamber 18. In upper chamber 17 is mounted a solenoid 60, such as commercially available Phillips Type 42 Stock No. 4225–11560, with associated components, such as plunger 61, extending into lower chamber, 18, where release mechanism assembly 70 is located.

Release mechanism assembly 70 includes linkage or connecting rod 71, one end of which is pinned to solenoid plunger 61, and the other end of which is pivotably connected to one leg of L-shaped member 72 and to one end of spring 73. The other end of spring 73 is connected to an internal abutment 74 mounted on the inner surface of lower chamber 18 of housing 16. Similarly, L-shaped member 72, at the intersection of its legs, is pivotably connected to an internal abutment 75 mounted on the inner surface of lower chamber 18 of housing 16. The other leg of L-shaped member 72 is pivotably connected to a cylindrical retractable pin or plunger 76 which is movable in a linear reciprocating motion through an opening in lower chamber 18 of housing 14.

A boot 19, of rubber or other suitable water and earth impervious flexible material, is affixed, by strapping or other suitable means, to the outer periphery of the lower portion 13 of housing 11 and the outer periphery of ring 45, to cover and to protect the parts internal of tool 10 and, at the same time, to permit flexibility in, around and about pivot point 34, FIGS. 1 and 2, where the actual leveling adjustments occur.

Housing 80 is affixed to cap 14 of housing 11; has an opening 81, FIG. 1, where a 15-pin female electrical connector (not shown) is positioned; has a spring-loaded attachment (not shown) for connecting the first section of pipe extensions (not shown); is closed at the top by a lid or plate (not shown); and acts as top cover for tool 10.

Wiring for parts of tool 10 to be activated and deactivated is internal of tool 10 and culminates at the female electrical connector (not shown) at opening 81, FIG. 1, of housing 80.

All housings, plates, caps, rings and the like of tool 10 are of metal, preferably of aluminum, except for boot 19 which preferably is of rubber and except for mercury level sensing device 50 which preferably is of a rigid electrically nonconductive plastic.

In FIG. 5 is depicted an embodiment of a velocity gage mount 90, which includes cylindrical container 91, cap 92 and collar 93, all of which are made of metal, preferably of aluminum. Container 91 is open at one end. Cap 92 is a round disk of the same diameter as the open end of container 91 and mates with, and is affixed to, container 91 at the opening. Collar 93 is affixed to cap 92. Collar opening 94 is of a diameter to accept the end of lower chamber 18 of housing 16, with cylindrical retractable plunger 76 in the retracted, i.e., "in," position. Plunger 76, when in an extended, i.e., "out," position, fits snugly into opening 95 and couples or locks velocity gage mount 90 to tool 10. Velocity gage 96 is mounted wholly, and securely, within velocity gage mount 90, to prevent movement of velocity gage 96 therein. Velocity gage instrument cable 97 leads from velocity gage 96 through an opening 98 in cap 92 to the surface where read-out instrument 99 is located.

In FIG. 6 is shown the wiring, including the associated components, of the velocity gage placement tool control panel 100 which includes housing 101, main power switch 102 with indicating light 103, four level indicating lights 104A, 104B, 104C and 104D, two level adjusting switches 105 and 106, a solenoid switch 107 with indicating light 108, gearmotor fuzes 109 and 110, capacitors 111 and 112, and external leads 113.

Also shown, in schematic form, in FIG. 6 is the wiring.

including the associated components, of the two gearmotors 20 and 30 which level in directions 90° to each other, in the same plane, as indicated; the mercury level sensing device 50; and solenoid release mechanism 70.

A power source 200 is, as shown, external to control panel 100.

An electrical control cable 300, FIG. 7, preferably of at least 110 feet in length, is used to permit the flow of electricity from control panel 100 to tool 10. Control cable 300 contains two three-pair-shielded cables (not shown), each wrapped in insulation tape for protection. A 15-pin male electrical connector (not shown) is attached to each end.

FIG. 7 shows, in schematic form, an external view of the placement tool assembly, except for means for lowering the placement tool assembly, such as a hand-operated winch, and except for pipe extensions, such as aluminum ones, which may be used to extend tool 10 into a borehole.

MODE OF OPERATION OF THE PREFERRED EMBODIMENT

As has been previously stated, one specific application of my invention is the lowering, placing, leveling and releasing, in a level condition, of a velocity gage in a borehole in the earth.

The procedure for doing so is, essentially, as follows:

The male electrical connector at one end of electrical control cable 300, FIG. 7, is plugged into the female electrical connector of control panel 100, FIGS. 6 and 7. Similarly, the male electrical connector at the other end of electrical control cable 300, FIG. 7, is plugged into the female electrical connector at opening 81 of housing 80, FIGS. 1 and 7.

The leads 113 from control panel 100 are connected to external power source 200, FIGS. 6 and 7.

Velocity gage 96, FIG. 5, is placed and secured within velocity gage mount 90, FIGS. 5 and 7.

Main power switch 102 of control panel 100, FIG. 6, is switched on. Then, solenoid switch 107 is moved to the "drop" position, thereby resulting in plunger 76, FIGS. 1 and 7, being in the retracted, or "in," position.

The lower portion of housing 16 of tool 10, FIGS. 1 and 2, is then inserted into collar opening 94 of velocity gage mount 90, FIG. 5, and is rotated so that the exterior vertical surface of retracted plunger 76 is in line with opening 95 of gage mount 90, FIG. 5.

Solenoid switch 107 of control panel 100, FIG. 6, is then moved to the "hold" position, thereby resulting in plunger 76, FIGS. 1 and 7, being extended, or in the "out" position, thereby engaging, coupling and locking velocity gage mount 90 to tool 10 at housing 16, FIG. 7.

Placement tool 10, FIGS. 1, 2 and 7, and coupled velocity gage mount 90, with velocity gage 96 therein, FIGS. 5 and 7, are lowered into the borehole (not shown), where it is desired to place, level and release velocity gage 96 in a level condition.

The lowering may be by hand-operated winch (not shown), in which case the winch is placed directly over the center of the hole and a steel cable (not shown) is attached to the side or the top of housing 80, FIG. 7, of tool 10, which is then lowered into the borehole by rotating the winch crank (not shown).

If it is desired to extend the upper rigid length of tool 10, pipe extensions (not shown), preferably of aluminum and preferably in twelve foot lengths, may be used. In this connection, it is to be remembered that housing 80, FIGS. 1, 2 and 7, has a spring-loaded attachment (not shown) for connecting the first pipe extension to tool 10. Subsequent extension pipe sections may be connected to the preceding oes by suitable means, such as spring-loaded attachments. The internal diameter of the pipe extension sections equal the outside diameter of housing 80.

When velocity gage mount 90 reaches the bottom of the borehole, the mercury level sensing device switch 102, FIG. 6, is moved to the "on" position.

If the velocity gage mount 90, with velocity gage 96 in a level condition therein, is level, then light indicators 104A, 104B, 104C and 104D, FIG. 6, will all be "on."

If any of the mercury level sensing device light indicators 104A, 104B, 104C and 104D, FIG. 6, are not "on," the appropriate gearmotor 20 or 30, FIGS. 1, 2 and 7, is activated by moving the appropriate switch 105 or 106, FIG. 6, the necessary distance in the indicated direction, until all light indicators, 104A, 104B, 104C and 104D, FIG. 6, are "on."

When leveling is achieved, it is advisable to pour backfill material into the borehole to a depth where only the velocity gage mount 90, with velocity gage 96 therein, is buried or submerged.

The leveled velocity gage mount 90, with the velocity gage 96 in a level condition therein, is then released from placement tool 10 by moving solenoid release mechanism switch 107, FIG. 6, to the "drop" or "release" position. As a result, plunger 76 of release mechanism 70 is retracted from opening 95 of gage mount 90.

There after, placement tool 10 is lifted out of, or otherwise retrieved from, the borehole.

Data from velocity gage 96 is transmitted to read-out instrument 99, at the surface, through instrument cable 97.

It is appropriate at this time, as a matter of summary, to stress that the leveling of velocity gage 96 is accomplished, essentially, by the plumb-and-bob type action and by the universal joint type action, caused by the pitch-and-roll like movement about "pivot point" (i.e., pin) 34, FIGS. 1, 2 and 3.

While there has been shown and described the fundamental features of my invention, as applied to a preferred embodiment, it is understood that various substitutions and omissions may be made by those skilled in the art without departing from the spirit of the invention. For example: If pipe extensions are used, and if they are marked on the outer surface thereof, and further if the pipes are interlocked so that the markings mate, then by facing the markings in a certain direction, i.e., azimuth, the velocity gage will not only be leveled, but also will be oriented as to a particular direction or azimuth. Further, although reference has been made to the placing, leveling and releasing, in a level condition, of a velocity gage, it is to be understood that the velocity gage mentioned was used as an example and that, in fact, my invention may be modified for use as a placement tool for any directional or level-sensitive transducer. Additionally, my invention may be modified to place, level and release a velocity gage, or other directional or level-sensitive transducer, directly, i.e., without the use of a mount (such as 90, FIG. 5), by drilling and tapping a bolt pattern on the transducer housing that would accommodate a mounting cap.

What I claim is:

1. An apparatus for lowering, placing and releasing in a level condition a level-sensitive device in a nearly vertical borehole comprising,
   a placement tool having a longitudinal axis and including,
   a first housing,
   a pair of reversible driving means within said first housing,
   a second housing substantially axially aligned with said first housing,
   a mercury level-sensing device associated with said second housing,
   linkage means interconnecting first and second housings,
   means connecting each of said pair of reversible driving means with said linkage means for varying the position of said second housing and associated level-sensitive device relative to the said longitudinal axis, each driving means providing variation about a separate axis of a pair of orthogonally related axes which are each perpendicular to said longitudinal axis, a closed container to house and securely hold the level-sensitive device in a fixed orientation relative thereto, means on each of said second housing and said container for selectively coupling and uncoupling said container to said second housing, means within said second housing for operating said means for coupling and uncoupling, means remote from said tool and said container for indicating the level of said second housing and container when said container is in a coupled condition, and means remote from said tool and said container for activating each of said driving means to obtain a leveling of said container and for activating said means for selectively coupling and uncoupling said container.

2. An apparatus in accordance with claim 1 including, a flexible boot between said housings for rendering said tool water and earth impervious, and means to raise and lower said placement tool.

References Cited

UNITED STATES PATENTS

| | | | |
|---|---|---|---|
| 1,007,998 | 11/1911 | Whalton | 33—206(.5L)UX |
| 1,928,971 | 10/1933 | Dillon et al. | 33—206(.5L)UX |
| 2,414,092 | 1/1947 | Charwinsky | 33—207X |
| 2,932,420 | 4/1960 | Mako et al. | 214—658 |
| 2,999,716 | 9/1961 | Elberty | 214—658X |
| 3,227,290 | 1/1966 | Lemelson | 214—1(R.C.M.) |
| 3,271,650 | 9/1966 | Riddle | 33—206(.5L)X |

FOREIGN PATENTS

| | | | |
|---|---|---|---|
| 640,350 | 3/1928 | France | 33—206(.5L) |

OTHER REFERENCES

German Utility Patent, Schwartzwalder etc., published Mar. 3, 1966, Pat. No. 1,934,801.

ROBERT B. HULL, Primary Examiner

U.S. Cl. X.R.

294—86.16, 88; 33—207; 73—151